(12) United States Patent
Ishii et al.

(10) Patent No.: US 7,210,790 B2
(45) Date of Patent: May 1, 2007

(54) PROJECTION TYPE VIDEO DISPLAY

(75) Inventors: Koji Ishii, Osaka (JP); Takashi Ikeda, Osaka (JP); Hideyuki Kanayama, Kyoto (JP); Yasuo Funazou, Nara (JP); Shunichi Kishimoto, Osaka (JP); Yoshihiro Yokote, Osaka (JP); Takashi Miwa, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 91 days.

(21) Appl. No.: 10/509,114

(22) PCT Filed: Mar. 26, 2003

(86) PCT No.: PCT/JP03/03757

§ 371 (c)(1),
(2), (4) Date: Jun. 3, 2005

(87) PCT Pub. No.: WO03/083574

PCT Pub. Date: Oct. 9, 2003

(65) Prior Publication Data

US 2005/0237500 A1    Oct. 27, 2005

(30) Foreign Application Priority Data

Mar. 28, 2002  (JP) .............................. 2002-091923
Dec. 12, 2002  (JP) .............................. 2002-361139

(51) Int. Cl.
*G03B 21/14* (2006.01)

(52) U.S. Cl. ....................................................... 353/61

(58) Field of Classification Search .................. 353/52, 353/57, 58, 60, 61, 122
See application file for complete search history.

(56) References Cited

U.S. PATENT DOCUMENTS

| 2005/0213048 A1* | 9/2005 | Ikeda et al. .................. 353/57 |
| 2006/0017889 A1* | 1/2006 | Ishii et al. .................... 353/57 |
| 2006/0061735 A1* | 3/2006 | Hsu ............................. 353/52 |

FOREIGN PATENT DOCUMENTS

| JP | 08-238441 | 9/1996 |
| JP | 10-241556 | 9/1998 |
| JP | 2000-171920 | 6/2000 |
| JP | 2001-222065 | 8/2001 |
| JP | 2001-330890 | 11/2001 |

* cited by examiner

*Primary Examiner*—William C. Dowling
(74) *Attorney, Agent, or Firm*—McDermott Will & Emery LLP

(57) ABSTRACT

An ion wind generator (20) is arranged on one side of a light source (1). The ion wind generator (20) produces an air current by negatively ionizing air by corona discharges at a needle electrode (21), or negative side, and drawing the negatively-ionized air at a cylindrical electrode (22), or positive side. The air current blows toward the light source (1) and removes heat generated by the light source (1). An ultraviolet ray from the light source (1) is introduced to a vent of the ion wind generator (20) by a first dichroic mirror (4) and a ultraviolet ray reflection mirror (17). Though air exhausted from the vent includes ozone ($o_3$) produced by corona discharges, the ozone is decomposed by the ultraviolet ray.

13 Claims, 5 Drawing Sheets

PROJECTION TYPE VIDEO DISPLAY

TECHNICAL FIELD

The present invention relates to a projection type video display such as a liquid crystal projector, and the like.

BACKGROUND ART

A projection type video display is so configured that light emitted from a light source is modulated by a light valve such as a liquid crystal panel to be projected, so that it must comprise a high-luminance light source. Consequently, measures to prevent heat generated from the high-luminance light source itself and heat generated when light is absorbed in a light polarizing plate in the liquid crystal panel or various types of optical components are required. Conventionally, a projection type video display has a structure in which air is sucked and exhausted and heat is released from the device by rotating a fan with a motor (see JP-A-2001-222065)

In a suction and exhaust mechanism using motor driving, however, noises are produced due to suction and exhaust sound by rotating sound of a motor and hissing sound of a fan. As a result, there is a disadvantage that the noise produced by the suction and exhaust sound is offensive to the ear when a projector is used.

DISCLOSURE OF INVENTION

In view of the foregoing circumstances, it is an object of the present invention to provide a projection type video display capable of reducing noises of air suction and exhaust up to almost soundless state.

In order to solve the above-mentioned problem, a projection type video display according to the present invention modulates a light emitted from a light source with a light valve to project the modulated light and is characterized in that there is provided a wind blower which generates an air current by ionizing air and molecules in the air using an electrode on one side and drawing ions generated by the ionization by an electrode on the other side, and in that an ultraviolet ray emitted from the light source is spectrally separated to apply to a wind generated by the wind blower. Also, the projection type video display which modulates a light emitted from a light source with a light valve to project the modulated light is characterized in that there is provided a wind blower which generates an air current by ionizing air by corona discharges using an electrode on one side and drawing the ionized air by an electrode on the other side.

In the above-mentioned configuration, the wind blower generates an air current by electrically moving the ionized air and the like. As a result, unlike a wind blower that generates a wind by rotating a fan, the wind blower produces no rotation noise and reduces noises of air suction and exhaust up to almost soundless state.

Ozone can be decomposed by the ultraviolet ray emitted from the light source, even if ozone is generated by discharges. Furthermore, the configuration allows an ultraviolet ray which is unnecessary in displaying a video to be effectively utilized.

It is possible to adopt a configuration that plural electrodes on one side are arranged in parallel or approximately in parallel and plural electrodes on the other side corresponding to the electrodes on one side are arranged in parallel or approximately in parallel. Such a configuration enables the wind power generated by the wind blower to be more high-powered. Alternatively, plural electrodes may be arranged as an electrode on one side and a mesh electrode may be arranged as an electrode on the other side. In such a configuration, it is easy to realize the reduced cost and the light weight.

An electrode on one side may comprise a metal plate having plural pointed portions on an edge. An assembling process is easier in such a configuration, compared with a configuration in which plural needle electrodes are arranged. Also in such a configuration that an electrode on one side comprises a metal plate having plural pointed portions, a mesh electrode may be arranged as an electrode on the other side. Furthermore, as an electrode on one side, plural metal plates having plural pointed portions may be arranged with keeping certain intervals each other. The electrode on one side having plural pointed portions may be made by etching metal plate. By adopting etching process, the pointed portions can be formed in an adequate shape.

Also, a projection type video display that modulates light emitted from a light source with a light valve to project the modulated light according to the present invention is characterized in that there is provided a wind blower which generates an air current by ionizing air and molecules in the air using an electrode on one side, or upstream side of air current, and drawing ions generated by the ionization by an electrode on the other side, or downstream side of air current and a plurality of said electrodes on one side are arranged and as an electrode on the other side, a mesh electrode is arranged so as to cross the direction of air current.

A projection type video display that modulates light emitted from a light source with a light valve to project the modulated light according to the present invention is characterized in that there is provided a wind blower which generates an air current by ionizing air and molecules in the air using an electrode on one side, or upstream side of air current, and drawing ions generated by the ionization by an electrode on the other side, or downstream side of air current and, said electrode on one side comprises a metal plate having plural pointed portions on an edge.

BEST MODE FOR CARRYING OUT THE INVENTION

A projection type video display of the present invention is now described referring from FIG. 1 to FIG. 7.

Figure 1:
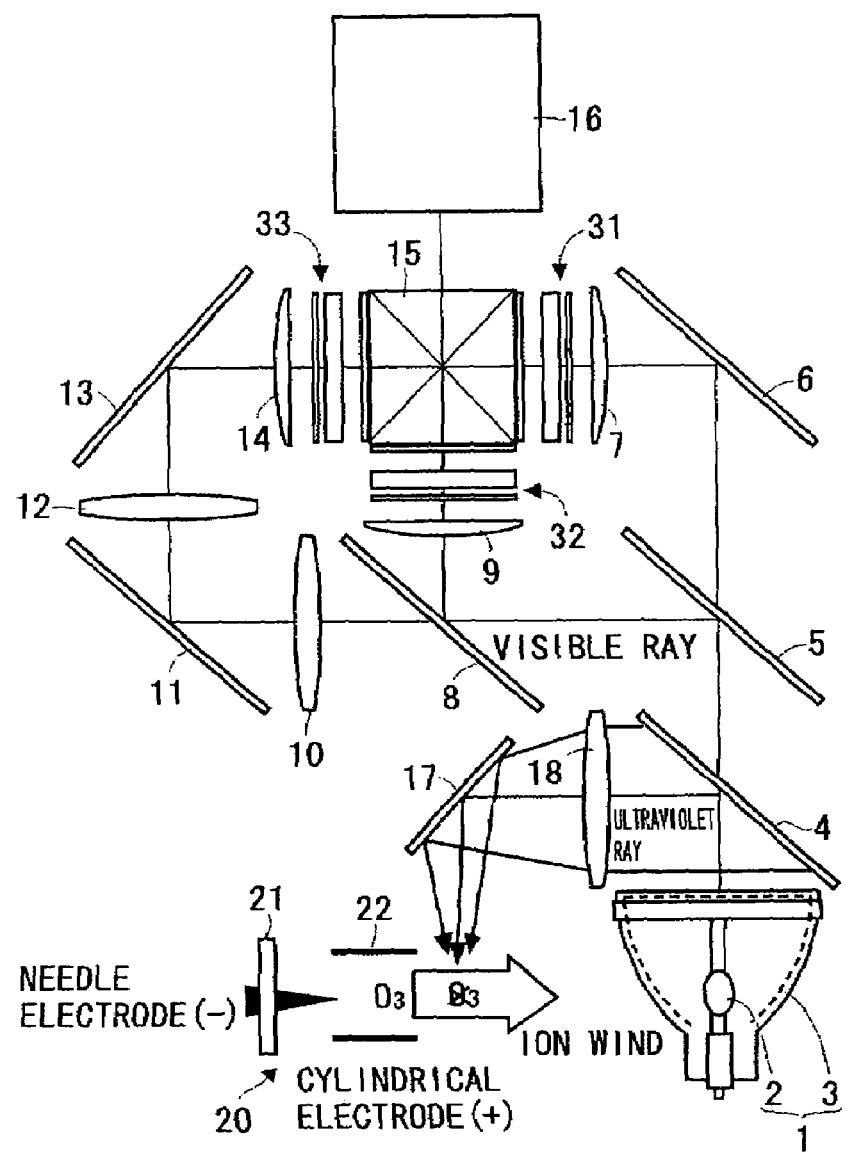
FIG. 1 is a diagram showing a projection type video display according to an embodiment of the present invention.

FIG. 1 is a diagram showing an optical system of a three-panel color liquid crystal projector. A light emitter 2 in a light source 1 is composed of an ultra-high pressure mercury lamp, a metal halide lamp, a xenon lamp, and the like, and light irradiated therefrom is emitted after being changed into parallel light, for example, by a parabola reflector 3.

A first dichroic mirror 4 is arranged at an oblique angle of 45 degrees to the direction of light emission of the light source 1, so that ultraviolet ray is reflected in a crosswise direction and components of wavelength other than ultraviolet ray are transmitted.

A second dichroic mirror 5 transmits light in a red wavelength band, while reflecting light in a cyan (green+blue) wavelength band. The light in the red wavelength band which has passed through the second dichroic mirror 5 is reflected from a mirror 6 so that its optical path is changed. The red light which has been reflected from the mirror 6 is optically modulated by passing through a transmission type liquid crystal light valve for red light 31 through a condenser lens 7. On the other hand, the light in the cyan wavelength band which has been reflected from the second dichroic mirror 5 is introduced into a third dichroic mirror 8.

The third dichroic mirror 8 transmits light in a blue wavelength band, while reflecting light in a green wavelength band. The light in the green wavelength band which has been reflected from the third dichroic mirror 8 is introduced into a transmission type liquid crystal light valve for green light 32 through a condenser lens 9, and is optically modulated by passing through the liquid crystal light valve 32. The light in the blue wavelength band which has passed through the third dichroic mirror 8 is introduced into a transmission type liquid crystal light valve for blue light 33 through mirrors 11 and 13, relay lenses 10 and 12, and a condenser lens 14, then the light is optically modulated by passing through the liquid crystal light valve 33.

Each of the liquid crystal light valves 31, 32, and 33 comprises an incidence-side polarizing plate, a panel constructed by sealing a liquid crystal between a pair of glass boards (where a pixel electrode and an alignment film are formed), and an emission-side polarizing plate. Modulated lights (video lights in respective colors) which have been respectively modulated by passing through the liquid crystal light valves 31, 32, 33 are mixed by a dichroic prism 15, to be a color video light. The color video light is enlarged and projected by a projection lens 16 and is displayed on a screen (not shown).

Figure 2:
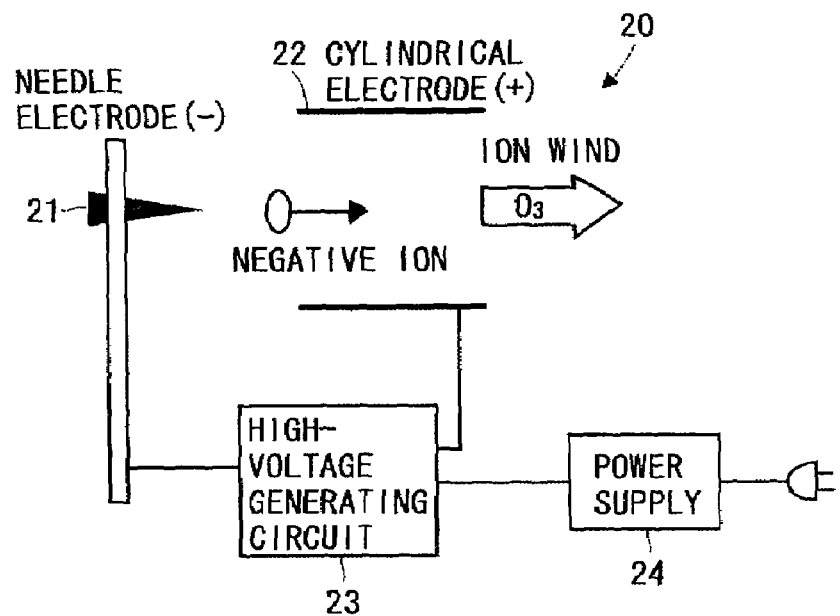
FIG. 2 is an explanatory view showing a configuration of an ion wind generator.

An ion wind generator 20 is provided at the side of the light source 1. As shown in FIG. 2, the ion wind generator 20 ionizes air by corona discharges using a negative-side needle electrode 21 and draws the ionized air by a positive-side cylindrical electrode 22 to produce an air current. A high-voltage generating circuit 23 receives voltage supply from a power supply 24 to generate a high voltage ranging from a few kilovolts to ten and several kilovolts and applies the high voltage to the electrodes 21 and 22.

As shown in FIG. 1, since an air supply port of the ion wind generator 20 faces the light source 1, the light source 1 is exposed to a generated air current by the ion wind generator. As a result, the air current removes heat from the light source 1. An ultraviolet ray converging lens 18 and an ultraviolet ray reflection mirror 17 are provided in a position where the ultraviolet ray reflected from the first dichroic mirror 4 strikes. The ultraviolet ray generated in the light source 1 is converged to be introduced to the vicinity of the air supply port of the ion wind generator 20 by the ultraviolet ray converging lens 18 and the ultraviolet ray reflection mirror 17. Although the air supplied from the air supply port of the ion wind generator 20 includes ozone ($o_3$) produced by corona discharges, the ozone is to be decomposed by the ultraviolet ray generated in the light source 1. An ultraviolet ray is unnecessary light in video projection. Rather, it is desirable that an ultraviolet ray is eliminated in illuminating light. In the present embodiment, an ultraviolet ray is not only eliminated but is effectively utilized to decompose ozone included in air supplied from the ion wind generator. In the above-mentioned configuration, the air supply port of the ion wind generator 20 is arranged to face the light source 1 to blow cooling air to the light source 1. Oppositely, the needle electrode 21 may be arranged in the vicinity of the light source 1 and the cylindrical electrode 22 may be arranged in a position distant from the light source 1 so that heat generated by the light source 1 is drawn with the ion wind generator 20.

Figure 3:
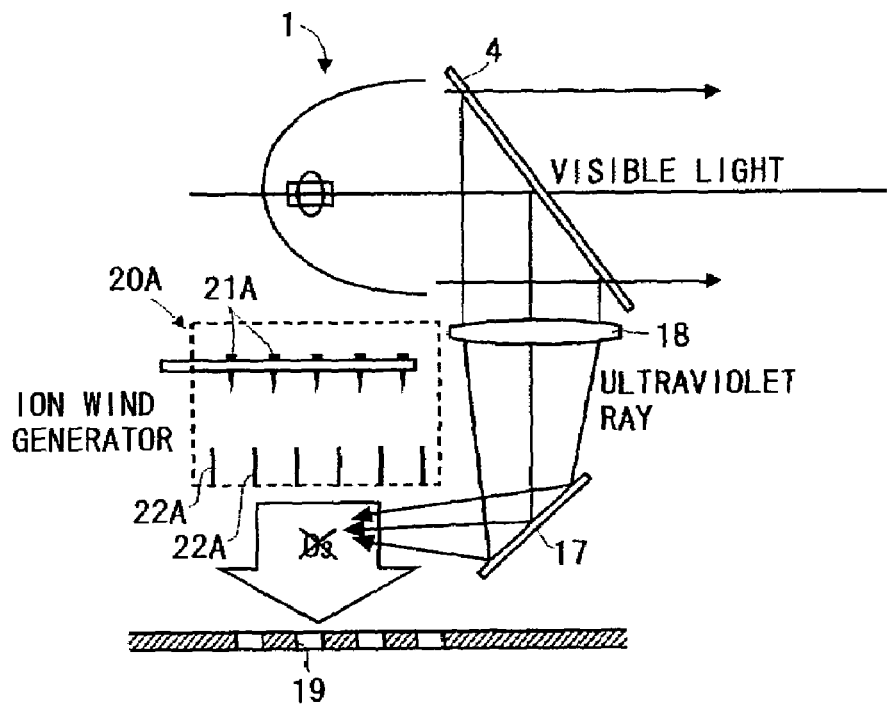
FIG. 3 is an explanatory view showing another configuration of an ion wind generator and its layout.

FIG. 3 shows a structure of the ion wind generator 20A and its layout. The ion wind generator 20A is so constructed that plural needle electrodes 21A are arranged in parallel or approximately in parallel and plural electrodes 22A corresponding to the needle electrodes are also arranged in parallel or approximately in parallel. That is, the ion wind generator 20A is equivalent to an assembly of plural ion wind generators 20 arranged in parallel or approximately in parallel, which means that some of electrodes 22A form cylinder portions adjoining each other. Accordingly, in such a configuration that plural ion wind generators are assembled and arranged in parallel or approximately in parallel, the wind power (the amount of wind) is increased. The direction of wind generated by the ion wind generator 20A is opposite to the light source 1, that is, the air supply port of the ion wind generator 20A is directed to vents 19 of the casing of the projector. When an air current generated by the ion wind generator 20A is exhausted through the vent 19, ambient air heated to high temperature by the heat produced by the light source 1 is drawn and exhausted from the vents 19 on the air current. Since ultraviolet ray is introduced to the position inside the vents, the amount of ozone exhaustion from the projector is reduced. Furthermore, it can be considered that an exhaust cylinder leading to the vents 19 is provided and the ion wind generator 20A is provided inside the cylinder which is partly made of ultraviolet transmission glass. This would make it possible to improve the exhaust efficiency while decomposing ozone by applying ultraviolet ray.

Figure 4:
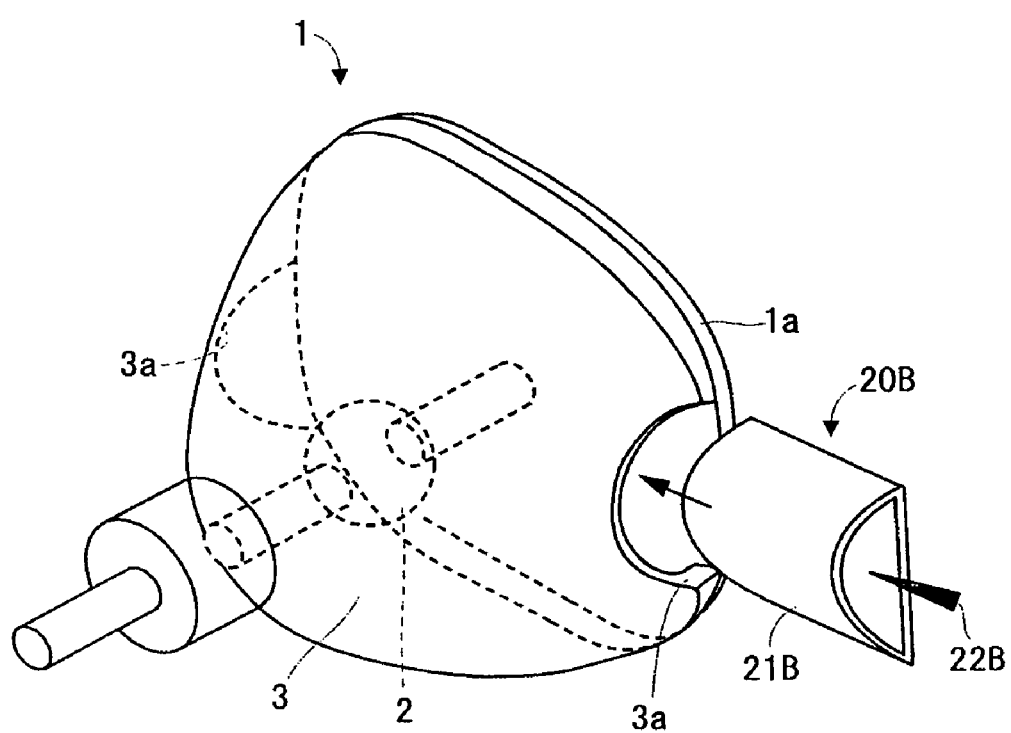
FIG. 4 is a perspective view showing a different configuration of an ion wind generator and its layout.

FIG. 4 shows a configuration in which an ion wind generator 20B is attached to a reflector of a light source 1. A transparent cover 1a is provided on the light exit side in order to prevent fragments of glass from flowing all over the place in case of burst of a light emitter 2 of the light source 1. In order to prevent the temperature of the air inside the light source from increasing, with the transparent cover 1a closed, cut-outs 3a and 3a are formed on both sides of a reflector 3 to release air in high temperature. The ion wind generator 20B comprises a needle electrode 21B and a cylindrical electrode 22B. The cylindrical electrode 22B is formed in a roughly semi-cylindrical shape corresponding to the shape of the cut-outs 3a. The ion wind generator 20B is attached to only one of the two cut-outs 3a, and the other cut-out 3a is used as an exhaust port. Ozone produced by corona discharges in the ion wind generator 20B is exposed to direct ultraviolet rays from the light source 1 in the reflector 3, and then the ozone is decomposed. That is, the first dichroic mirror 4 and ultraviolet ray reflection mirror 17 are unnecessary in such a configuration. It is desirable that mesh members are attached to the cut-outs 3a in order to prevent fragments of glass from flowing all over the place in case of burst of a light emitter 2.

Figure 5:
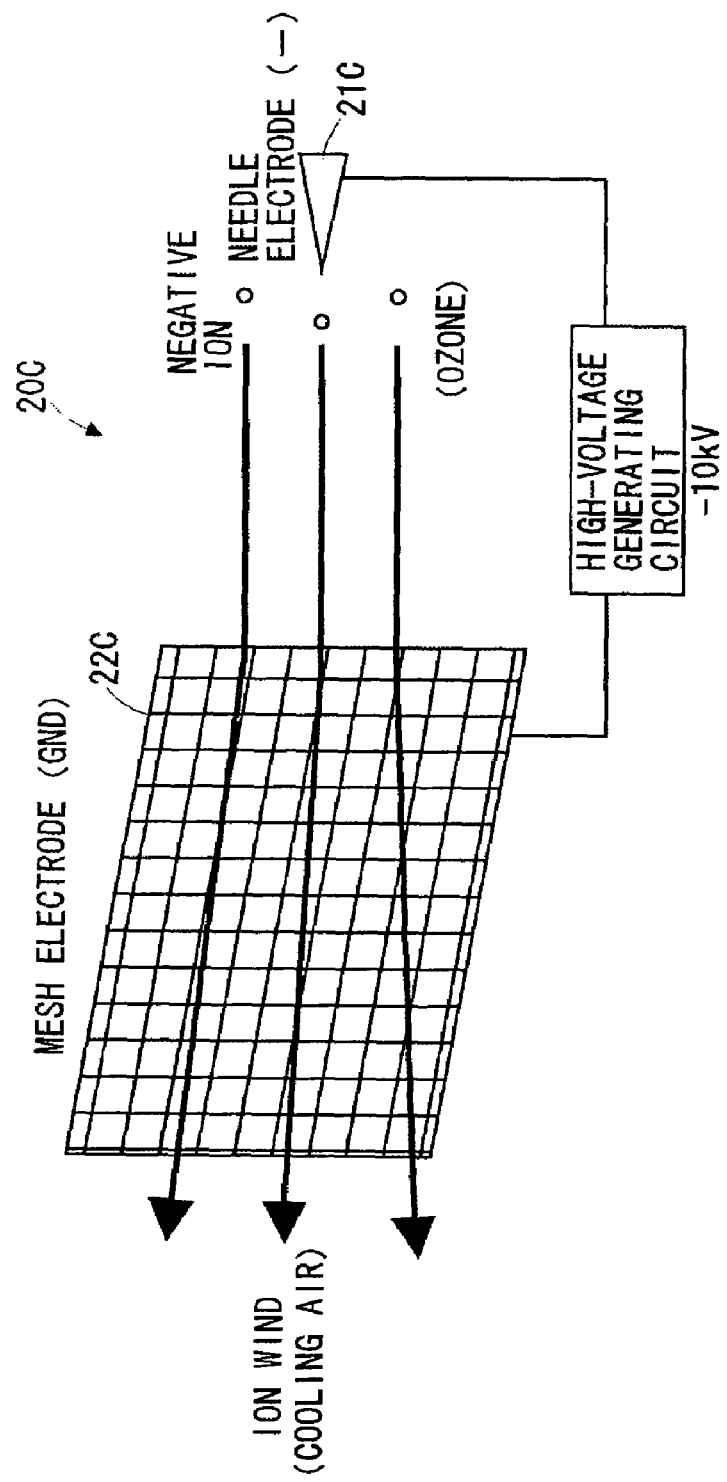
FIG. 5 is a perspective view showing another different configuration of an ion wind generator.

FIG. 5 shows a structure of an ion wind generator 20C. The ion wind generator 20C comprises a needle electrode 21C and a mesh electrode 22C. Compared with a configuration in which plural cylindrical electrodes are arranged, it is easier to realize the reduced cost and the light weight in a configuration that the mesh electrode 22C is used.

Figure 6:
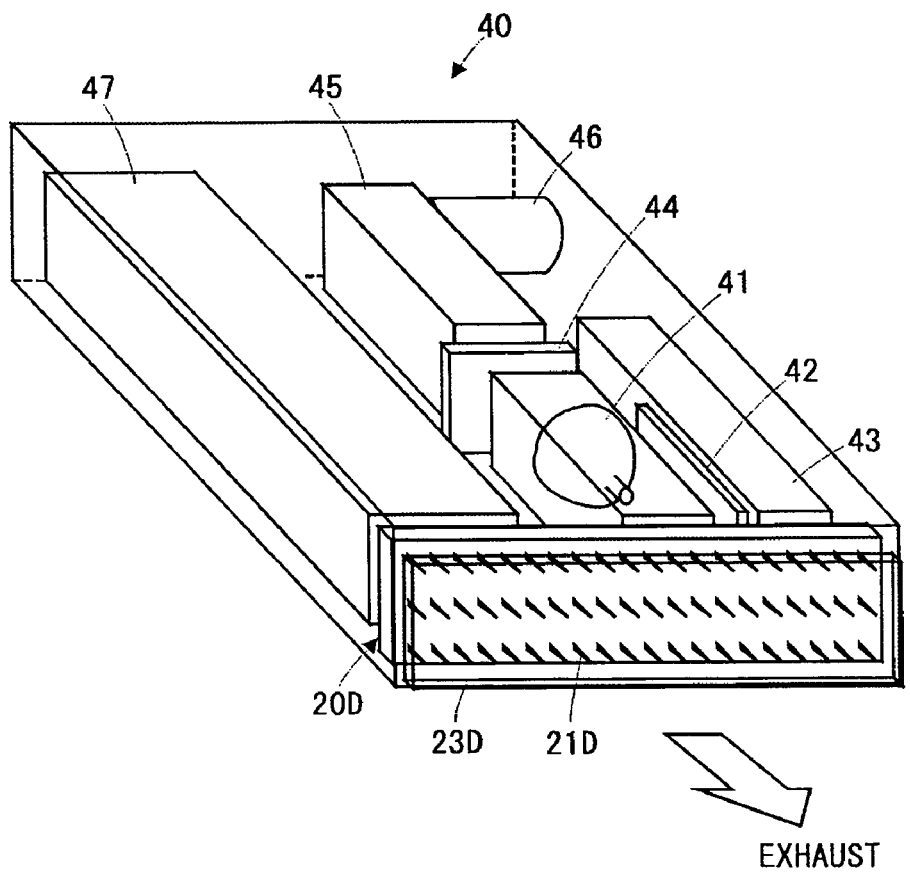
FIG. 6 is a perspective view showing another different configuration of an ion wind generator its layout.
Figure 7:
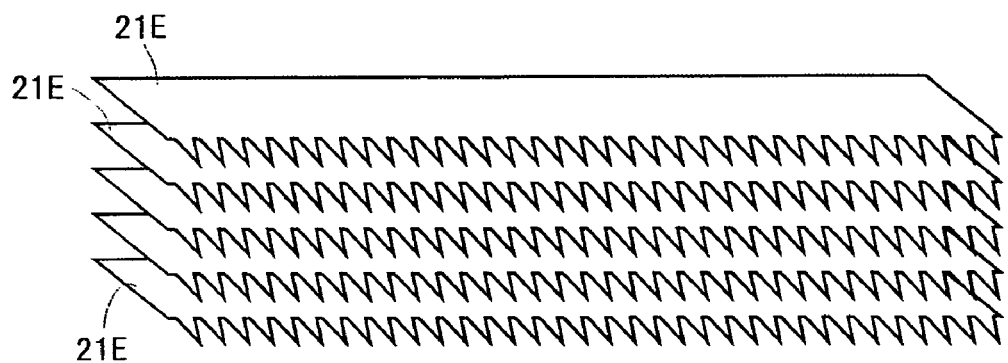
FIG. 7 is a perspective view showing another different configuration (structure of electrodes) of an ion wind generator.

FIG. 6 is a perspective view showing an internal structure of a projection type video display 40 which is provided with an ion wind generator 20D. The projection type video display 40 comprises a white light source 41, an auxiliary fan 42, a power supply 43, a color wheel 44, a video generating optical system 45, a projection lens system 46, and a signal processing circuit 47. The ion wind generator 20D is so arranged as to occupy almost entire surface of one side of the casing which is closer to the white light source 41. The ion wind generator 20D is provided with plural needle electrodes 21D as electrodes on one side and said mesh electrode, for example, as an electrode on the other side. In this way, in a configuration that a lot of needle electrodes 21D are arranged with occupying almost entire surface of one side of the casing, the wind power (the amount of wind) is increased. The direction of the wind generated by the ion wind generator 20D is opposite to the location where the white light source 41 is arranged (the direction outward from the projector). When an air current generated by the ion wind generator 20D is exhausted outward from the casing, ambient air heated to high temperature by the white light source 41 is drawn to be exhausted outside the casing on the air current. Furthermore, since the ion wind generator 20D is provided with an ozone removal filter 23D, ozone ($o_3$) produced by discharges is decomposed and removed when the air is exhausted. The ozone removal filter 23D may be constructed by additionally attaching a catalyst such as manganese dioxide to a supporting body in a honey-comb shape.

In the above-mentioned configuration, plural electrodes 21D are arranged. Other than the configuration, some electrode plates 21E having plural pointed portions respectively on one side of the edges may be arranged with keeping certain intervals each other as shown in the FIG. 7. Each pointed portion of the electrode plates 21E functions as one needle electrode. In such a configuration, the structure is simpler and the assembling process is easier, compared with the configuration in which a lot of needle electrodes are arranged. The electrode plates 21E can be made by pressing (press-cut) a metal plate, but the electrode plates in this embodiment are made by etching process. The etching process has such an advantage that the pointed portions can be formed more easily in an adequate shape (suitable for reducing discharge sound and improving air supply efficiency, and the like).

Though the ion wind generator is arranged in the vicinity of the light source 1 in the configurations mentioned above, the present invention is not limited to the same. The ion wind generator may be arranged at another location where air is heated to high temperature (the location near a liquid crystal display panel, or the like). Also, the positive-negative relationship between the electrode on one side and the electrode on the other side in an ion wind generator may be reversed. Other type of ion wind generators having structures different from the specific configurations mentioned above can be used, as far as ion wind generators are so constructed that an air current is generated by ionization of air or molecules in the air.

In the afore-mentioned configuration, the video generating optical system using three transmission-type liquid crystal display panels is shown, but the present invention is not limited to the same video generating optical system. The present invention can also be adopted when other video generating optical system is used.

As described above, the wind blower according to the present invention has a mechanism that produces ion wind. As a result, unlike a wind blower that generates a wind by rotating a fan, the wind blower of the present invention produces no rotation noise and reduces noises up to almost soundless state when air is sucked and exhausted. In the configuration that the ultraviolet ray emitted from the light source is spectrally separated to irradiate to a wind generated by the wind blower and in the configuration that the ozone removal filter is provided, there is an advantage in that ozone is prevented from being exhausted outside the projector, even if ozone is generated.

The invention claim is:

1. In a projection type video display that modulates light emitted from a light source with a light valve to project the modulated light;

a projection type video display characterized in that there is provided a wind blower which generates an air current by ionizing air and molecules in the air using an electrode on one side and drawing ions generated by the ionization by an electrode on the other side, and in that an ultraviolet ray emitted from the light source is spectrally separated to apply to a wind generated by the wind blower.

2. In a projection type video display according to claim 1, a projection type video display characterized in that plural electrodes on one side are arranged and plural electrodes on the other side corresponding to said electrodes on one side are arranged in parallel or approximately in parallel.

3. In the projection type video display according to claim 1, a projection type video display characterized in that plural electrodes on one side are arranged and a mesh electrode as an electrode on the other side is arranged.

4. In the projection type video display according to claim 1, a projection type video display characterized in that an electrode on one side comprises a metal plate having plural pointed portions on an edge.

5. In the projection type video display according to claim 4, a projection type video display characterized in that a mesh electrode is arranged as an electrode on the other side.

6. In the projection type video display according to claim 4 or 5, a projection type video display characterized in that the plural electrodes on one side having plural pointed portions are arranged with keeping certain intervals each other.

7. In the projection type video display according to claim 4 or 5, a projection type video display characterized in that the electrode on one side having plural pointed portions made by etching metal plate.

8. In a projection type video display that modulates light emitted from a light source with a light valve to project the modulated light;

a projection type video display characterized in that there is provided a wind blower which generates an air current by ionizing air and molecules in the air using an electrode on one side, or upstream side of air current, and drawing ions generated by the ionization by an electrode on the other side, or downstream side of air current and, a plurality of said electrodes on one side are arranged and as an electrode on the other side, a mesh electrode is arranged so as to cross the direction of air current.

9. In a projection type video display that modulates light emitted from a light source with a light valve to project the modulated light;

a projection type video display characterized in that there is provided a wind blower which generates an air current by ionizing air and molecules in the air using an electrode on one side, or upstream side of air current, and drawing ions generated by the ionization by an electrode on the other side, or downstream side of air current and, said electrode on one side comprises a metal plate having plural pointed portions on an edge.

10. In a projection type video display according to claim 9, a projection type video display characterized in that a mesh electrode is arranged as an electrode on the other side.

11. In the projection type video display according to claim 9 or 10, a projection type video display characterized in that a plurality of said electrodes on one side having plural pointed portions are arranged with keeping certain intervals each other.

12. In the projection type video display according to claim 9 or 10, a projection type video display characterized in that the electrode on one side having plural pointed portions made by etching metal plate.

13. In the projection type video display according to claim 1, 8, or 9, a projection type video display characterized in that the wind blower is located in the vicinity of the light source having a reflector so as to exhaust heat generated by the light source outside from the video display and, the wind blower is provided at the back of the reflector.

* * * * *